B. A. L. HASSELBERG, E. L. NORDQUIST & J. I. WOLLGAST
APPARATUS FOR MANUFACTURING SCREW NAILS AND THE LIKE.
APPLICATION FILED MAR. 10, 1914.
1,201,582.
Patented Oct. 17, 1916.
5 SHEETS—SHEET 1.
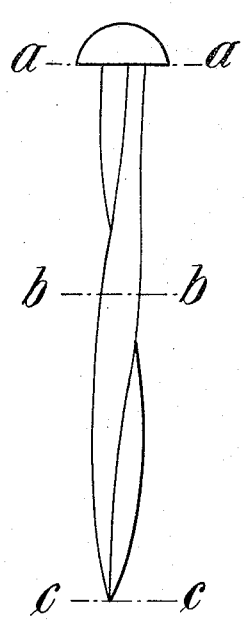
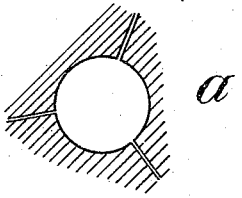
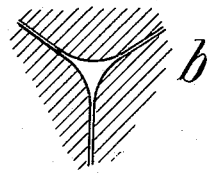
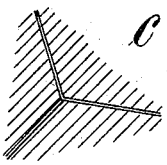
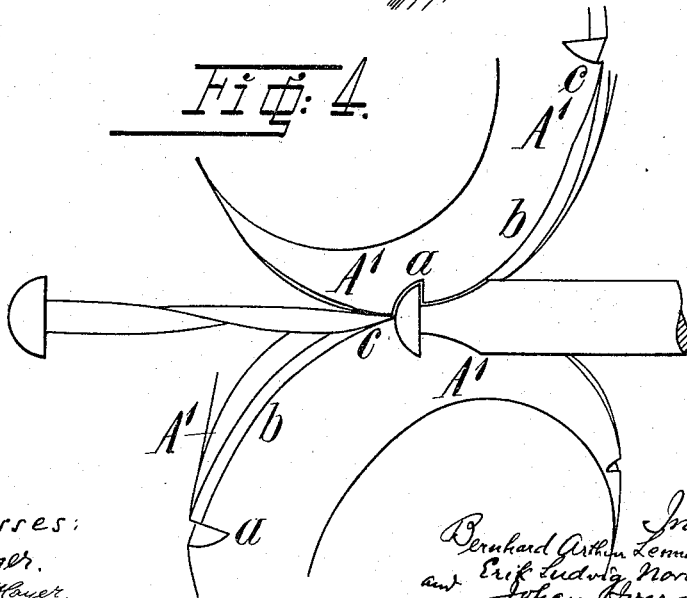

B. A. L. HASSELBERG, E. L. NORDQUIST & J. I. WOLLGAST.
APPARATUS FOR MANUFACTURING SCREW NAILS AND THE LIKE.
APPLICATION FILED MAR. 10, 1914.

1,201,582.

Patented Oct. 17, 1916.
5 SHEETS—SHEET 2.

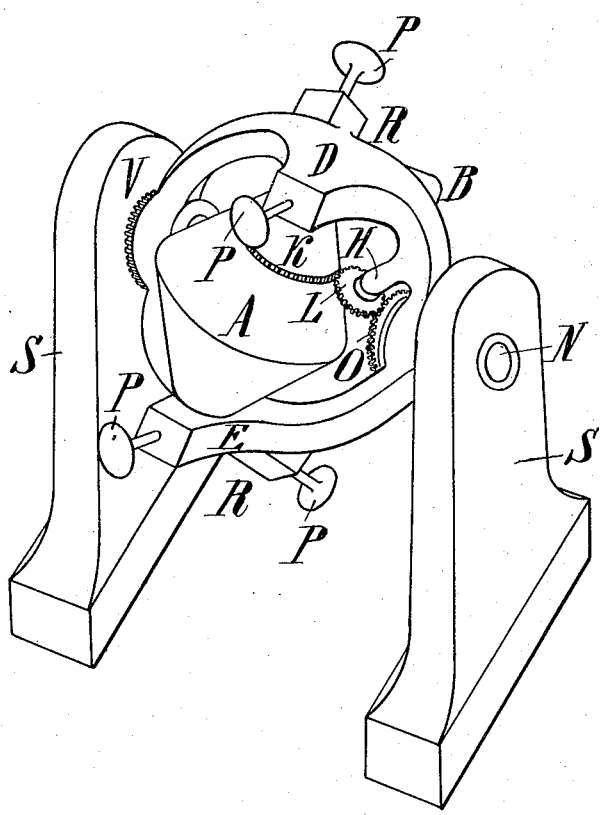

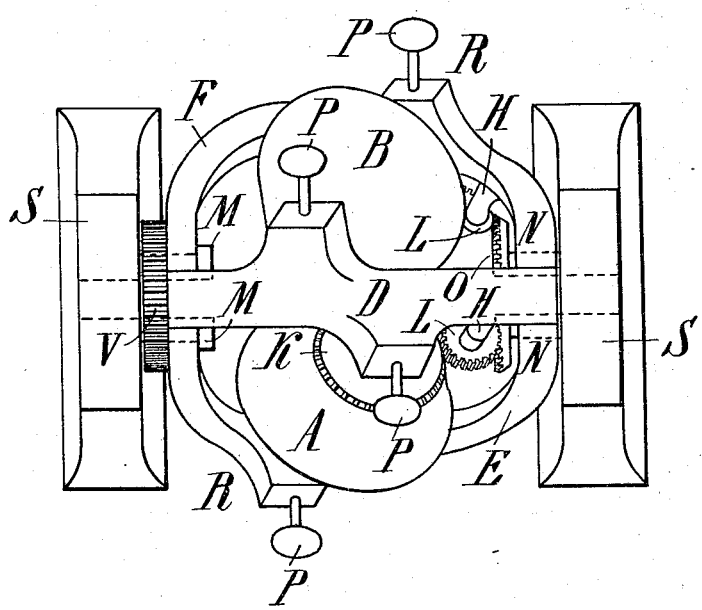

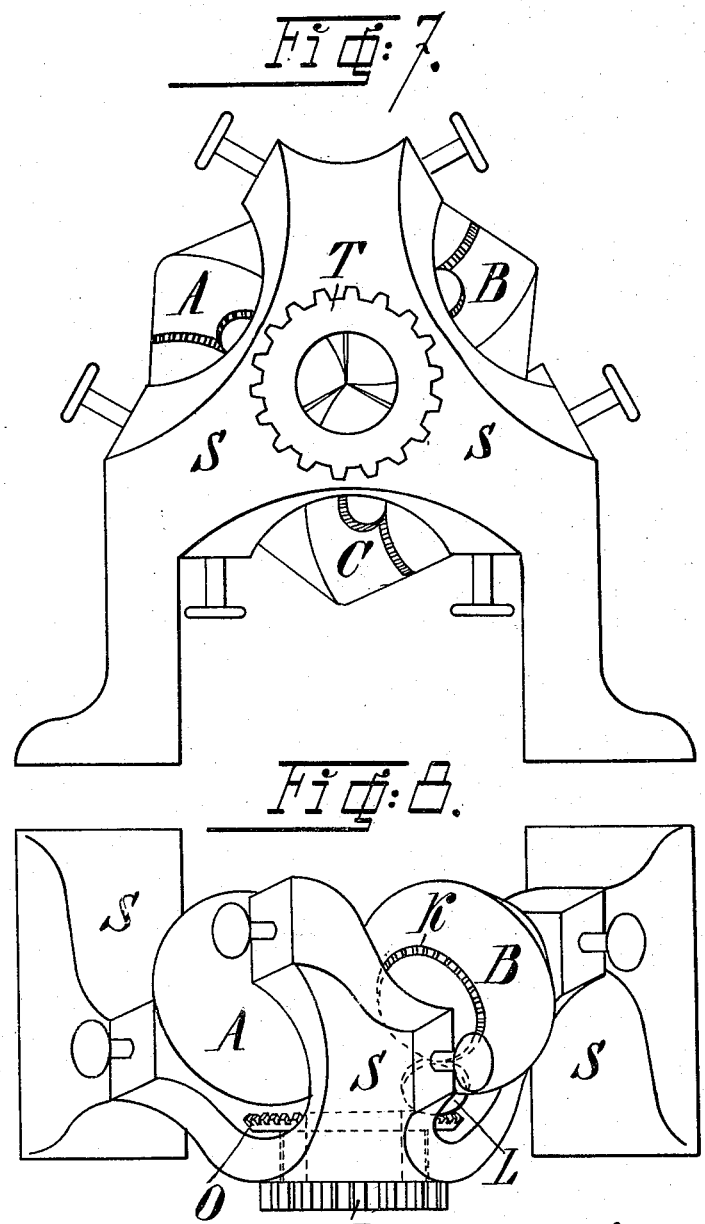

UNITED STATES PATENT OFFICE.

BERNHARD ARTHUR LENNART HASSELBERG, ERIK LUDVIG NORDQUIST, AND JOHAN IVAR WOLLGAST, OF STOCKHOLM, SWEDEN.

APPARATUS FOR MANUFACTURING SCREW-NAILS AND THE LIKE.

1,201,582.　　　　　Specification of Letters Patent.　　Patented Oct. 17, 1916.

Application filed March 10, 1914. Serial No. 823,681.

*To all whom it may concern:*

Be it known that we, BERNHARD ARTHUR LENNART HASSELBERG, a subject of the King of Sweden, and resident of Drottninggatan 48, Stockholm, Sweden, ERIK LUDVIG NORDQUIST, a subject of the King of Sweden, and resident of Sigtunagatan 3, Stockholm, Sweden, and JOHAN IVAR WOLLGAST, a subject of the King of Sweden, and resident of Scheelegatan 14, Stockholm, Sweden, have invented certain new and useful Improvements in Apparatus for Manufacturing Screw-Nails and the like, of which the following is a specification.

Our invention relates to a nail so constructed that after being driven into wood for instance in the usual manner by means of hammer blows it is held by the wood with greater strength than is the case with the forms of nails hitherto known.

Our invention more particularly relates to rolling mills for manufacturing such nails.

As is well known nails are generally made in the shape of wedges and after being driven in they are held in place only by the friction between the wood pressed toward the sides or the lateral surfaces of the nails, unless the nails be driven wholly through the wood or bent and riveted on its back. Where a strong connection between two bodies nailed together is required and for any reason riveting cannot be effected a difficulty often arises in obtaining the necessary strength of connection by means of common wedge-shaped nails. This inconvenience, however, is removed by our invention which refers to a nail provided with longitudinal screw threads having such a pitch that the nail when driven in by means of blows turns about its longitudinal axis. This obviously permits the nail to get a secure hold and an extraordinarily strong connection between two parts thus nailed together is obtained, as a nail of this construction cannot be removed from the wood without being turned in an opposite direction to the one caused by driving in the nail.

In the accompanying drawings there is shown a form of nail according to our invention and forms of rolling mills for manufacturing said nail.

Figure 2:
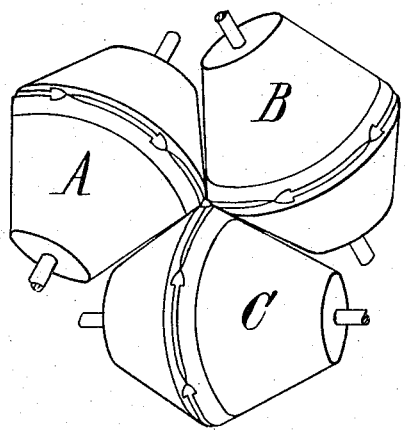
Figure 3:
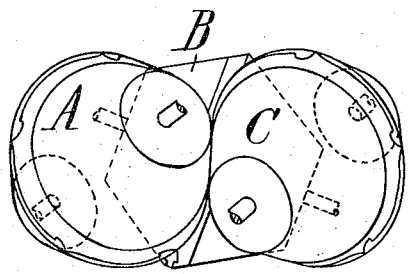

Figure 1 shows the nail in a side view. Figs. 2 and 3 show a system of rolls, Fig. 4 shows part of two rolls having the necessary grooves for making the screw nail. Figs. 5, 6, 7 and 8 show diagrammatically the system of rolls mounted and two forms of the driving arrangements. Figs. 9 *a*, *b* and *c* are sections through the point of contact of the rolls in different positions.

In the form of the nail as shown herein the same is provided with three longitudinal threads disposed an angular distance apart of 120°. Therefore, when the nail is driven into a fibrous material, for instance wood, always at least two of its threads will cut the fibers at the point of the nail. This results in an essential advantage over a nail of the usual wedge-like construction, which previously to its being driven in must be adjusted with its cutting edge at right angles to the fibers of the wood (for preventing a breaking of the wood), an adjustment which in our construction is not necessary. The manufacture of such a nail is effected by means of a system of coöperating rolls, each provided with such grooves and describing such a movement as to cause the blank introduced between them in the form of a bar to be directly rolled into the desired form.

In order to facilitate the forming of the screw nail by rolling (without rotating the blank) the rolls must describe such a movement that the grooves on them press out directly the threads on the iron bar introduced between the rolls. This movement of the rolls in the arrangement shown in Figs. 5 and 6 is effected by a combination of two movements, viz. the rotation of the rolls themselves about their axes arranged in a particular manner and the rotation of the whole system about an axis at right angles to the plane passing through the centers of the rolls. With said plane the axes of the rolls form equal angles which, as clearly seen from Figs. 2 and 3 are turned in the same direction and whose dimensions evidently will determine the pitch of the threads of the screw-nail in such a way that the pitch is diminished with the increasing of the angles.

From Figs. 2, 4 and 9 the appearance and disposition of the grooves of the rolls necessary for the forming of the screw-nail are seen. Said grooves are evidently subjected to great stresses during the rolling and therefore the metal adjacent thereto should be made of essentially stronger material than the one necessary for the roll itself.

For this purpose the middle portion of the roll is formed in the manner illustrated in Fig. 4 with a steel band $A^1$ in which the necessary groove is cut. The grooves cut in the steel bands of all the rolls are identical and arranged in such a manner that corresponding parts of the grooves during rolling always at the same time clasp and press the blank intended to be formed into a screw-nail. The form of the groove is seen from Fig. 9 where the views marked $a$, $b$ and $c$ are sections through the points of contact of the rolls at right angles to the axis of the screw-nail when the portions of the grooves marked $a$, $b$ and $c$ in Fig. 4, corresponding to sections on the lines $a$—$a$, $b$—$b$ and $c$—$c$ in Fig. 1, are in operative position. That portion of the groove adapted to form the body of the screw-nail has the shape of a rounded ridge tapering toward the end for forming the point of the screw-nail.

Fig. 4 shows diagrammatically how the blank introduced between the rolls is directly rolled into a finished screw-nail.

In the form of rolling mill for manufacturing screw-nails as shown diagrammatically in Figs. 5 and 6 there is mounted on the housing frame S a rotating frame R in the three arms D, E and F in which the shafts of the coöperating rolls A, B and C (C is not shown) are mounted. By means of the hand wheels P the pressure required between the rolls may be adjusted. The shape and appearance of the arms of the frame is best shown in Fig. 6 where one of those arms, D, is shown in a view from above. On each roll there is provided a toothed ring K each engaging one of the three toothed wheels L mounted in the parts H projecting from the arms, said toothed wheels engaging the toothed wheel O rigidly fixed to the housing frame on the inside. By this arrangement the rolls will evidently be rotated when the frame R is made to rotate by means of the gear V driven from a source of power not shown. The ratio between the speed of rotation of the rolls about their axes and of the whole system, which determines the pitch of the threads on the screw-nail, is obtained in the well known way by a selection of the size of the toothed wheels. The rotating frame R, as seen from Fig. 6, is mounted on the tubular projections M and N inserted in the housing frame. The blank is introduced into the machine through one of these tubular projections while the finished screw-nail is removed through the other tube.

In Figs. 7 and 8 another form of the rolling mill is shown in side and top view, respectively. In this construction the system of rolls is not rotated but rotation is imparted the blank during the rolling. The rotation of the rolls about their axes is effected in the same manner as in the form of rolling mill shown in Figs. 5 and 6, the toothed wheel O, however, not being rigidly connected with the housing frame. The motive power in this case acts on the toothed wheel T rigidly connected with the wheel O. The axes of the rolls are inclined in the same direction toward a plane passing through the centers of the circles of the grooves, forming equal angles with said plane.

We claim:—

1. A rolling mill for manufacturing screw-nails, comprising a system of three coöperating rolls, each having a plurality of grooves on its circumference, the rolls being relatively so positioned that corresponding parts of the grooves in the various rolls during their rotation always at the same time grasp and press the blank, the shafts of the various rolls being inclined in the same direction and forming equal angles with the plane through the centers of the circles described by the grooves, and means for rotating the rolls in the same direction.

2. A rolling mill for manufacturing screw-nails, comprising a rotatable frame, a system of three coöperating rolls carried by said frame, each roll having on its circumference a plurality of grooves, the rolls being relatively so positioned in said frame, that corresponding parts of the grooves in the various rolls always at the same time grasp and press the blank, the axes of the rolls forming equal angles with the plane passing through the centers of the rolls, and means for rotating the said frame and the rolls.

In testimony whereof we have signed our names to this specification, in the presence of two subscribing witnesses.

BERNHARD ARTHUR LENNART HASSELBERG
ERIK LUDVIG NORDQUIST.
JOHAN IVAR WOLLGAST.

Witnesses:
  NILS ENGARDT,
  A. HELJESTRAND.

Copies of this patent may be obtained for five cents each, by addressing the "Commissioner of Patents, Washington, D. C."